United States Patent
Sethi et al.

(10) Patent No.: US 6,289,329 B1
(45) Date of Patent: *Sep. 11, 2001

(54) SYSTEM FOR CONVERTING NEURAL NETWORK TO RULE-BASED EXPERT SYSTEM USING MULTIPLE-VALUED LOGIC REPRESENTATION OF NEURONS IN FEEDFORWARD NETWORK

(76) Inventors: Ishwar K. Sethi, 1677 Heatherwood, Troy, MI (US) 48098; Jae H. Yoo, 110-302 Hangkanghyundae Apt. 28, Heukseok 2 Dong, Dong Jak-Gu, Seoul (KR), 156-072

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/979,295

(22) Filed: Nov. 26, 1997

(51) Int. Cl.[7] .................................................. G06E 1/00
(52) U.S. Cl. ................................ 706/26; 706/15; 706/25
(58) Field of Search .................................. 706/15, 16, 25, 706/45, 46, 47, 61, 26, 44, 56

(56) References Cited

U.S. PATENT DOCUMENTS 5,398,300 * 3/1995 Levey ..................................... 706/16
5,438,644 * 8/1995 Fu .......................................... 706/12

(List continued on next page.)

OTHER PUBLICATIONS

Zeleznikow et al, "The split up system: integrating neural networks and rulebased resoning in leagal domain", ACM pp 185–194, Aug. 1995.*

Bochereau et al, "Extracting knowledge by means of a multilayer neural network application to muncipal jurisprudence", PP 288–296, 1991.*

(List continued on next page.)

Primary Examiner—Mark Powell
Assistant Examiner—Anil Khatri
(74) Attorney, Agent, or Firm—Harness, Dickey & Pierce, P.L.C.

(57) ABSTRACT

A computer-implemented apparatus and method for generating a rule-based expert system from a trained neural network which is expressed as network data stored in a computer-readable medium. The rule-based expert system represents an interconnected network of neurons with associated weights data and threshold data. A network configuration extractor is provided for accessing the network data and for ascertaining the interconnection structure of the trained neural network by examining the network data. A transformation system is utilized to alter the algebraic sign of at least a portion of the weights data to eliminate differences in the algebraic sign among the weights data while selectively adjusting the threshold data to preserve the logical relationships defined by the neural network. A symbolic representation generator applies a sum-of-products search upon each neuron in the network to generate a multivalued logic representation for each neuron. A propagation mechanism combines the multivalued logic representation of each neuron through network propagation to yield a final logical expression corresponding to a rule-based expert system of the trained neural network. The resulting apparatus permits the knowledge incorporated in the connection strengths of neurons to be expressed as rule-based expert system.

12 Claims, 10 Drawing Sheets

U.S. PATENT DOCUMENTS

| | | | |
|---|---|---|---|
| 5,448,681 | * | 9/1995 | Khan ........................................ 706/23 |
| 5,465,320 | * | 11/1995 | Enbutsu et al. ......................... 706/23 |
| 5,524,176 | * | 6/1996 | Nartia et al. .............................. 706/2 |
| 5,524,178 | * | 6/1996 | Yokono .................................... 706/25 |
| 5,734,797 | * | 3/1998 | Deangelis et al. ...................... 706/15 |
| 5,740,322 | * | 4/1998 | Inoue ....................................... 706/45 |
| 5,826,249 | * | 10/1998 | Skeirik .................................... 706/25 |
| 5,875,284 | * | 2/1999 | Watanabe et al. ......................... 706/2 |
| 6,119,112 | * | 8/2000 | Bush ....................................... 706/25 |

OTHER PUBLICATIONS

Siegelman et al, "On the computational power of neural nets", COLS ACM pp 440–449, Aug. 1995.*

Sethi, I. K. et al. "Extraction of Diagnostic Rules Using Neural Networks," Proceedings of the Sixth Annual IEEE Symposium on Computer–Based Medical Systems, 1993. pp. 217–222.*

Huang, S. H. et al. "Providng Understanding of the Behavior of Feedforward Neural Networks," IEEE Transactions on Systems, Man and Cybernetics, Part B. vol. 27, No. 3, pp. 465–474, Jun. 1997.*

Fu, L. "Rule Generation from Neural Networks," IEEE Transactions on Systems, Man and Cybernetics. vol. 24, No. 8, pp. 1114–1124, Aug. 1994.*

Gallant, S. "Connectionist Expert Systems," Communications of the ACM, vol. 31, No. 2, pp. 152–189, Feb. 1988.*

Saito, K. et al., "Medical Diagnostic Expert System Based on PDP Model," IEEE International Conference on Neural Networks, 1988. vol. 1, pp. 255–262.*

* cited by examiner

If
    $x_1$ is true and two or more variables of $x_2$, $x_3$, $x_4$ and $x_5$ are true, or
    $x_1$ is true and one or more variables of $x_2$, $x_3$, $x_4$ and $x_5$ are true, and
    one or more variables of $x_6$, $x_7$, $x_8$, $x_9$ and $x_{10}$ are true, or
    $x_1$ is true and two or more variables of $x_6$, $x_7$, $x_8$, $x_9$ and $x_{10}$ are true, or
    three or more variables of $x_2$, $x_3$, $x_4$ and $x_5$ are true, or
    two or more variables of $x_2$, $x_3$, $x_4$ and $x_5$ are true, and
    one or more variables of $x_6$, $x_7$, $x_8$, $x_9$ and $x_{10}$ are true, or
    one or more variables of $x_2$, $x_3$, $x_4$ and $x_5$ are true, and
    three or more variables of $x_6$, $x_7$, $x_8$, $x_9$ and $x_{10}$ are true, or
    all variables of $x_6$, $x_7$, $x_8$, $x_9$ and $x_{10}$ are true then
    the example belongs to positive class;

Fig. 6

Feature 2

SYSTEM FOR CONVERTING NEURAL NETWORK TO RULE-BASED EXPERT SYSTEM USING MULTIPLE-VALUED LOGIC REPRESENTATION OF NEURONS IN FEEDFORWARD NETWORK

BACKGROUND AND SUMMARY OF THE INVENTION

The present invention relates generally to computer-implemented artificial intelligence systems. More particularly, the present invention relates to computer-implemented neural networks and expert systems.

Despite their success in diverse application domains for difficult classification tasks, feedforward networks are still viewed as black boxes by many users. This is due to the fact that the internal representation learned by a feedforward network for a classification task is not transparent, i.e. the knowledge embodied in network's numerical weights is not easily comprehensible. According to Minsky, this problem of internal representation of a trained network being opaque is a crucial problem as many real world applications often require multiple representation schemes for acquired knowledge (Minsky, M. "Logical versus analogical or symbolic versus connectionist or neat versus scruffy," *AI Magazine*, Vol 12, pp 34–51, 1991). Furthermore, the users of neural networks are unable to gain better understanding of a classification task learned by a network when the knowledge acquired by a neural network through training remains incomprehensible.

To alleviate the problem of opacity, several schemes in the literature have been suggested. These schemes fall into one of two categories. The first category consists of schemes as discussed for example by Fu and by Gallant that attempt to explain the knowledge stored in connection weights of a trained network by a set of rules for explaining the output in terms of inputs (see, Fu, L. "Rule generation from neural networks," *IEEE Trans. Systems, Man, and Cybernetics*, Vol 24, pp 1114–1124, 1994; and Gallant, S. I. "Connectionist Expert Systems," *Comm. ACM*, Vol 31, pp 152–169, 1988). While these schemes make the transference of knowledge embodied in a network into another representation possible, they fail to bring out the internal representation learned by hidden units by stressing only the input-output behavior.

The second category of schemes are more focused on hidden units and try to bring out the features developed by internal units as a result of training. The Hinton diagram, which relies on a pictorial representation of connection weights to represent the concepts learned by internal neurons is an example of this category (see, Hinton, G. E. "Connectionist learning procedures," *Artificial Intelligence*, Vol 40, pp 185–234, 1989).

The methods described by Saito and Nakano, as well as by Fu are based on a heuristic search which is conducted separately for positive and negative weights. (see, Saito, K. and Nakano, R. "Medical diagnostic expert system based on PDP model," *Proc. IEEE Int'Conf. Neural Networks*, Vol I, pp 255–262, 1988; and Fu, L. "Rule generation from neural networks," *IEEE Trans. Systems, Man, and Cybernetics*, Vol 24, pp 1114–1124, 1994). Moreover, these methods have a requirement of a set of training examples along with numerical weights in order to uncover the knowledge stored in a network.

The present invention overcomes these and other disadvantages found in previous approaches. The present invention extends the symbolic mapping to a multiple-valued logic (MVL) representation of a neuron. This extension to MVL representation is desirable due to several factors. First, multivalued inputs, e.g. the eye color attribute—brown, black, and blue, or the status of blood pressure—low, normal, and high, are natural in many applications, and thus MVL representation is the most appropriate representation. Second, MVL representation can be easily used to deal with continuous inputs by multilevel quantization. Third, multivalued logic provides a compact representation even for neurons with binary inputs by grouping several binary features into a single multivalued feature. Moreover, the present invention symbolic mapping process uncovers an algorithm learned by a network without worrying about the set of training examples that might have been used.

In accordance with the teachings of the present invention, a computer-implemented apparatus and method is provided for generating a rule-based expert system from a trained neural network which is expressed as network data stored in a computer-readable medium. The rule-based expert system represents an interconnected network of neurons with associated weights data and threshold data. A network configuration extractor is provided for accessing the network data and for ascertaining the interconnection structure of the trained neural network by examining the network data.

A transformation system is utilized to alter the algebraic sign of at least a portion of the weights data to eliminate differences in the algebraic sign among the weights data while selectively adjusting the threshold data to preserve the logical relationships defined by the neural network. A symbolic representation generator applies a sum-of-products search upon each neuron in the network to generate a multivalued logic representation for each neuron. A propagation mechanism combines the multivalued logic representation of each neuron through network propagation to yield a final logical expression corresponding to a rule-based expert system of the trained neural network.

The present invention utilizes the following expressions in order to accomplish the aforementioned operations. If $x_i$ is a multivalued variable which takes any value in the set $P_i = \{0, 1, \ldots p_i - 1\}$, then for any subset $S_i \subseteq P_i$, $x_i^{S_i}$ is a literal of $x_i$ representing the function such that:

$$x_i^{S_i} = \begin{cases} 1 & \text{if } x_i \in S_i \\ 0 & \text{if } x_i \notin S_i \end{cases}$$

When $S_i = P_i$, the value of the literal is always 1, and when $S_i = \emptyset$, the value of the literal is always 0. The complement of the literal, denoted as $\overline{x}_i^{S_i}$, is defined as $$\overline{x}_i^{S_i} = x_i^{P_i - S_i}$$

Additionally, a product of literals $x_1^{s_1} x_2^{s_2} \ldots x_n^{s_n}$ is termed within the present invention a product. A multiple-valued input, binary-valued output function or simply a Boolean function is a mapping according to the following expression:

$$f : \left( \prod_i^n P_i \right) \to B$$

where $P_i = \{0, 1, \ldots, p_i - 1\}$ and $B = \{0, 1\}$. A Boolean function expressed as a sum of product form is said to be in sop or disjunctive normal form (dnf).

The following expression for $f$ is an example of dnf representation with three variables $x_1, x_2,$ and $x_3$ with $P_1 = \{0, 1\}$, $P_2 = \{0, 1, 2\}$, and $P_3 = \{0, 1, 2\}$.

$$f = x_1^0 x_2^{\{1,2\}} \vee x_1^1 x_2^0 x_3^{\{0,1\}}$$

In the following fashion, $f$ can be written using complement of the second literal in the second product term.

$$f = x_1^0 x_2^{\{1,2\}} \vee x_1^1 \overline{x_2}^{\{1,2\}} x_3^{\{0,1\}}$$

The truth table for function $f$ is shown in Table 1.

TABLE 1

| $x_1$ | 0 | 0 | 0 | 0 | 0 | 0 | 0 | 0 | 0 | 1 | 1 | 1 | 1 | 1 | 1 | 1 | 1 | 1 |
|---|---|---|---|---|---|---|---|---|---|---|---|---|---|---|---|---|---|---|
| $x_2$ | 0 | 0 | 0 | 1 | 1 | 1 | 2 | 2 | 2 | 0 | 0 | 0 | 1 | 1 | 1 | 2 | 2 | 2 |
| $x_3$ | 0 | 1 | 2 | 0 | 1 | 2 | 0 | 1 | 2 | 0 | 1 | 2 | 0 | 1 | 2 | 0 | 1 | 2 |
| $f$ | 0 | 0 | 0 | 1 | 1 | 1 | 1 | 1 | 1 | 1 | 1 | 0 | 0 | 0 | 0 | 0 | 0 | 0 |

A multiple-valued input, multiple-valued output function is a mapping $$f : \left( \prod_i^n P_i \right) \to R$$

where $P_i = \{0, 1, \ldots, p_i - 1\}$ and $R = \{0, 1, \ldots, r-1\}$. A multiple-valued input, multiple-valued output function is expressed through $r$ multiple-valued input, binary output functions, one function for each output state.

The multiple-valued logic provides a compact notation even for applications that essentially deal with binary logic. This feature of multivalued logic is used in designing programmable logic arrays with decoders. For example, consider the following function of three binary variables $x_1$, $x_2$, and $x_3$:

$$f = x_1 x_2 \vee x_2 x_3 \vee x_3 x_1$$

In this example, a multivalued variable $y$ is defined which takes any value in the set $\{0, 1, 2, 3\}$ in such a way that value $r$ implies $r$ of the variables $x_1$, $x_2$, and $x_3$ are true. The above function $f$ can then be expressed in MVL as:

$$f = y^{\{2,3\}}$$

which is a compact representation in comparison with binary logic representation. Furthermore, this representation brings out the condition that $f$ is true if two or three of the inputs are true more clearly that the binary logic representation.

For a more complete understanding of the present invention, its objects and advantages, reference may be had to the following specification and to the accompanying drawings.

DESCRIPTION OF THE PREFERRED EMBODIMENTS

The present invention utilizes a mapping method for obtaining multiple-valued logic representation of neurons in feedforward networks to deal with neurons that have multivalued inputs as well as continuous inputs. The present invention is particularly applicable when the signal values are constrained to lie in the range of either [0, +1] or [−1, +1].

Figure 1:
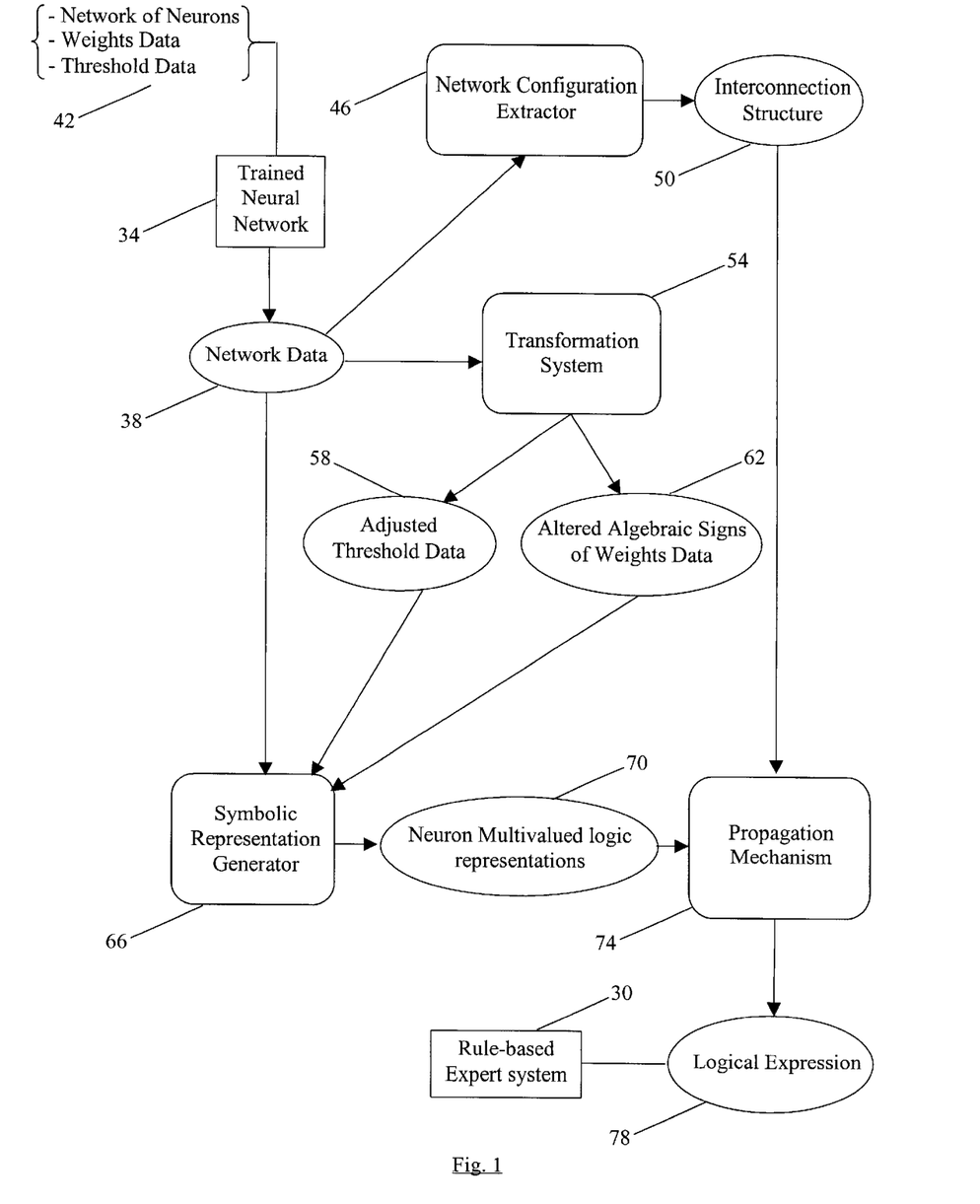
FIG. 1 is an entity relationship diagram depicting the components of the present invention for producing a logical expression corresponding to a rule-based expert system of a trained neural network.

With reference to FIG. 1, the present invention generates a rule-based expert system 30 from a trained neural network 34 which is expressed as network data 38 stored in a computer-readable medium. The rule-based expert system 30 represents item 42 which is an interconnected network of neurons with associated weights data and threshold data. A network configuration extractor 46 is provided for accessing the network data 38 and for ascertaining the interconnection structure 50 of the trained neural network 34 by examining the network data 38.

A transformation system 54 is utilized to alter the algebraic sign of at least a portion of the weights data to eliminate differences in the algebraic sign among the weights data while selectively adjusting the threshold data to preserve the logical relationships defined by the neural network. The output of transformation system 54 is adjusted threshold data 58 and altered algebraic signs of weights data 62.

A symbolic representation generator takes the output from the transformation system 54 and applies a sum-of-products search upon each neuron in the network to generate a multivalued logic representation 70 for each neuron. A propagation mechanism 74 combines the multivalued logic representation 70 of each neuron through network propagation to yield a final logical expression 78 corresponding to a rule-based expert system 30 of the trained neural network 34.

Encoding of Multivalued Variables

The notation $q(x_i^j)$ is used to represent the encoding of a multivalued variable $x_i$ when it takes the j-th value from the set $P_i = \{0, 1, \ldots, p_i - 1\}$. The set of encoded values, the quanta set, is herein denoted as $Q_i$. In the p-valued 0/1 encoding scheme, $q(x_i^j)$ is given as:

$$q(x_i^j) = \frac{j}{p_i - 1}, \text{ for } j = 0, 1, \ldots, p_i - 1.$$

In the p-valued −1/1 scheme, $q(x_i^j)$ is encoded as $$q(x_i^j) = \frac{2j - (p_i - 1)}{p_i - 1}, \text{ for } j = 0, 1, \ldots, p_i - 1.$$

Thus for a multivalued variable x which takes values in the set P={0,1, . . . , 4}, the different states will be encoded as {0,0.25,0.5,0.75,1} and {−1,−0.5,0,0.5,1} respectively, in 0/1 and −1/1 encoding schemes.

While the 0/1 and −1/1 encoding schemes encode different states with uniformly spaced quanta set, it is also possible to follow a general $q_{min}/q_{max}$ encoding scheme where a multivalued variable can have a quanta set with nonuniformly spaced set of quanta values as well as have extreme values not necessarily encoded as 0/1 or −1/1 as the case may be depending upon the polarity of the neurons used. Such a general encoding scheme is useful for unordered multinomial variables such as color with red, green, and blue being the different states of the variable.

The encoding of such variables in neural networks is usually done in unary notation. For example, the different colors, red, green, and blue, will be generally encoded as 100, 010, and 001 respectively. Such an encoding is orderless. However, an ordering among different states is possible based on fan-in weights once a neural network is trained. For example, if the fan-in weights for red, green, and blue input lines to a neuron for a color variable are $w_r$, $w_g$, and $w_b$ respectively, then the $q_{min}/q_{max}$ encoding scheme allows to replace the three separate input lines for red, green, and blue states of the color variable with a single input line with weight equal to $|w_r|+|w_g|+|w_b|$ using the following encoding for the three different states of the color variable $$q(\text{color}^{red}) = \frac{w_r}{|w_r| + |w_g| + |w_b|},$$

$$q(\text{color}^{green}) = \frac{w_g}{|w_r| + |w_g| + |w_b|},$$

and $$q(\text{color}^{blue}) = \frac{w_b}{|w_r| + |w_g| + |w_b|}$$

As this example illustrates, the $q_{min}/q_{max}$ encoding makes it possible to treat ordered as well as unordered multivalued variables in a unified manner.

Symbolic Representation of a Neuron

The neurons in feedforward networks use either a logistic function or a hyperbolic tangent function to provide smooth nonlinearity as required by the backpropagation training procedure. However, the neurons in feedforward networks at the end of training are often found to take on extreme values. Thus for symbolic representation purposes, the neurons in a trained feedforward network can be viewed as having a threshold function as a nonlinearity. Such neurons are generally known as perceptrons. A perceptron is fully characterized by n+1 real numbers consisting of n input weights, $w_1, w_2, \ldots, w_n$, and a threshold value T. It produces an output of 1 whenever the activation sum equals or exceeds the threshold T; otherwise it produces a 0 output. With discrete inputs, binary or multivalued, a perceptron is considered to implement a Boolean function $f$ which is defined by the following equations:

$$f(x_1, x_2, \ldots, x_n) = 1, \text{ if } \sum_{i=1}^{n} w_i q(x_i) \geq T$$

$$f(x_1, x_2, \ldots, x_n) = 0, \text{ if } \sum_{i=1}^{n} w_i q(x_i) < T$$

A single perceptron realizes a certain class of Boolean functions, called the threshold logic functions or linearly separable functions. However, any arbitrary Boolean function is realizable through a network of perceptrons.

Figure 2A:
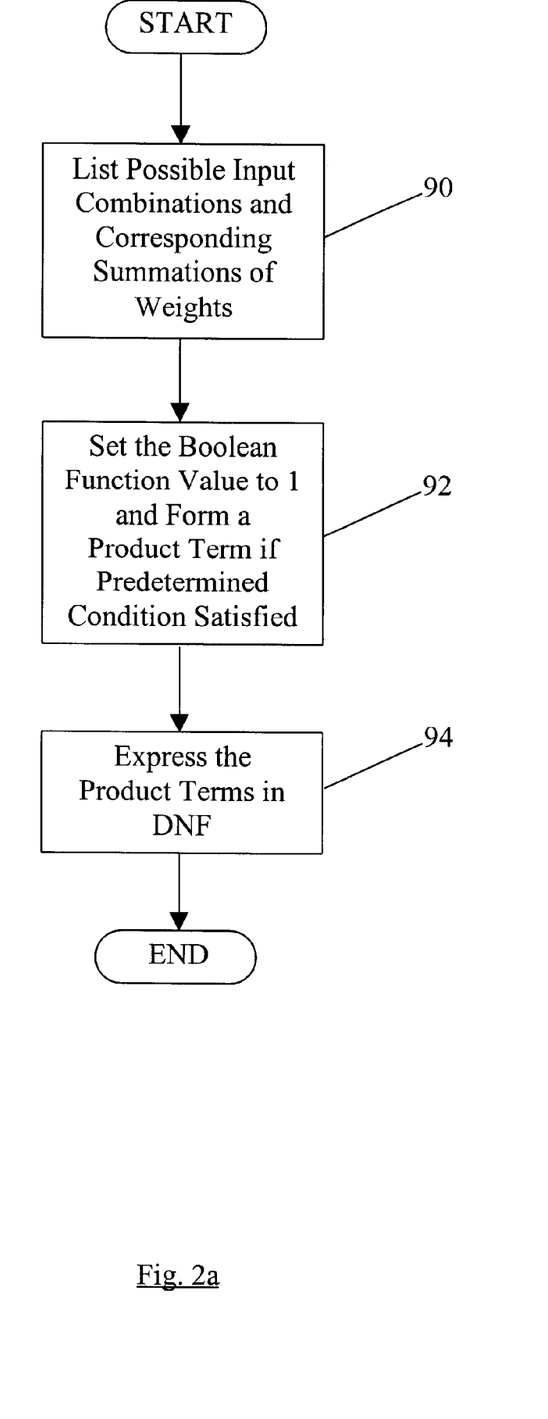
FIG. 2a is a flow chart depicting the operations performed for obtaining a boolean function representative for a given neuron.

With reference to FIG. 2a, the Boolean function represented by a perceptron can be obtained by the following steps (given the input weights and the threshold value along with the encoding scheme): (1) at block 90, list all possible input combinations and corresponding summations of weights; (2) at block 92, for each summation that is greater than or equal to the threshold value, set the Boolean function value to 1 and form a product term representing the input combination; (3) at block 94, express the product terms in a simplified disjunctive normal form to obtain the required Boolean function. The Boolean function thus obtained represents the neuron under consideration in symbolic form.

TABLE 2

| $q(x_1)$ | $q(x_2)$ | $q(x_3)$ | $\Sigma w_i q(x_i)$ | f |
|---|---|---|---|---|
| 0 | 0 | 0 | 0 | 0 |
| 0 | 0 | 0.5 | −0.5 | 0 |
| 0 | 0 | 1 | −1 | 0 |
| 0 | 0.5 | 0 | 1 | 0 |
| 0 | 0.5 | 0.5 | 0.5 | 0 |
| 0 | 0.5 | 1 | 0 | 0 |
| 0 | 1 | 0 | 2 | 1 |
| 0 | 1 | 0.5 | 1.5 | 1 |
| 0 | 1 | 1 | 1 | 0 |
| 1 | 0 | 0 | 3 | 1 |
| 1 | 0 | 0.5 | 2.5 | 1 |
| 1 | 0 | 1 | 2 | 1 |
| 1 | 0.5 | 0 | 4 | 1 |
| 1 | 0.5 | 0.5 | 3.5 | 1 |
| 1 | 0.5 | 1 | 3 | 1 |
| 1 | 1 | 0 | 5 | 1 |
| 1 | 1 | 0.5 | 4.5 | 1 |
| 1 | 1 | 1 | 4 | 1 |

An example of the above process, for a perceptron with 3-inputs, $x_1, x_2$, and $x_3$ with $P_1=\{0,1\}$, $P_2=\{0,1,2\}$, and $P_3=\{0,1,2\}$, having weights of 3, 2, and −1 respectively and a threshold of 1.5, is shown partly in Table 2 which lists all possible input combinations under the p-valued 0/1 encoding of the input variables, the activation sum in each case, and the Boolean function value. Upon minimization, the Boolean function realized by this perceptron is given as $f = x_1^1 \vee x_1^1 x_2^2 x_3^{\{0,1\}}$ which is its symbolic representation.

Backtracking Search For Symbolic Mapping

Figure 2B:
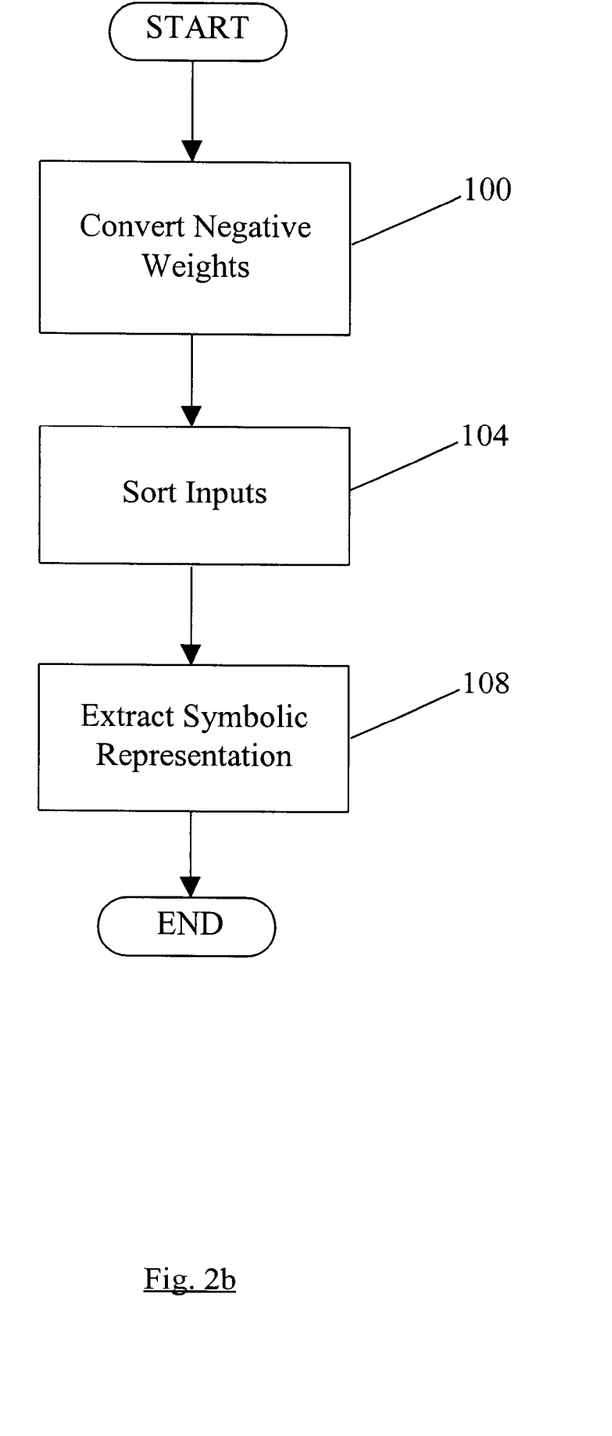
FIG. 2b is a flow chart depicting the operations performed for a backtracking search procedure.

The aforementioned enumeration procedure becomes difficult with increasing number of inputs to a neurons. With reference to FIG. 2b, a backtracking search procedure having the following steps is used for binary inputs:

1. Convert all negative weights to positive weights through a suitable transformation (block 100).
2. Sort inputs by arranging weights in descending order (block 104).
3. Recursively extract the symbolic representation by using the depth-first backtracking tree search (block 108).

The first step of weight conversion (block 100) treats all weights in a uniform manner. This step involves complementing all negative weights and corresponding inputs as well as adjusting the threshold value. The second step of weight sorting (block 104) ensures that the search is done in an optimal order and unnecessary terms in the symbolic representation are not generated. The third step (block 108) involves the actual backtracking tree search which relies on two functions, the bounding function and the solution function, to conduct an efficient search. The bounding function in the search procedure eliminates the possibility of generating any unnecessary subpath which cannot lead to a solution. Similarly, the solution function ensures that no unnecessary superset of any solution subset is generated during the search process.

Figure 3:
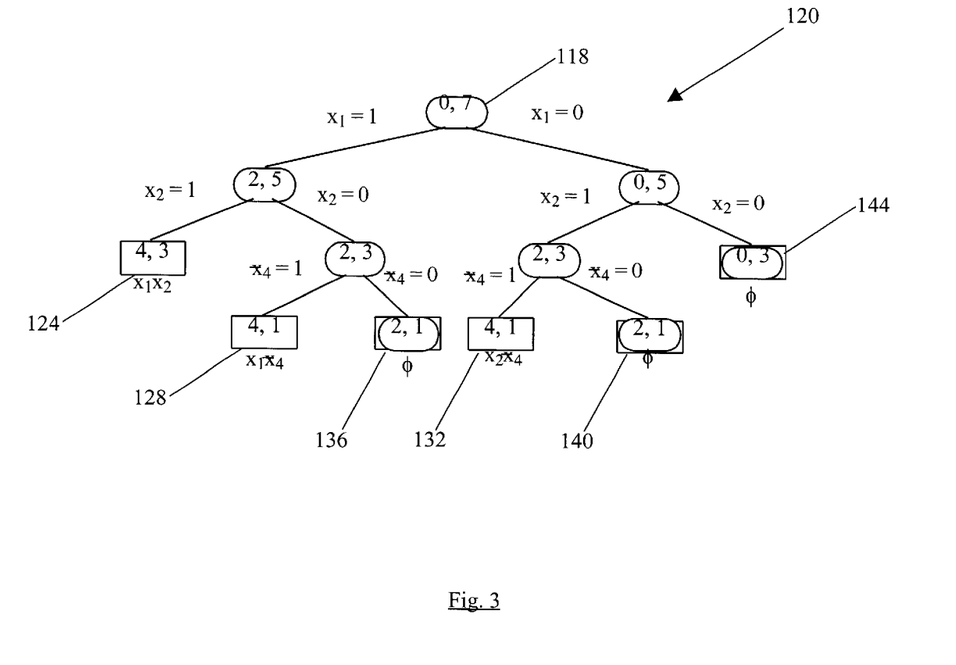
FIG. 3 is a tree diagram depicting the symbolic mapping of an exemplary binary neuron.

An example of this procedure for a four input binary neuron having input weights of 2, 2, −1, −2 and threshold of 0.5 is shown in tree 120 of FIG. 3. In this tree, each node (e.g., node 118) has two numbers. The first number is the activation sum of the selected inputs thus far and the second number is the maximum activation sum due to the remaining inputs yet to be considered. These two numbers correspond to the two terms of the bounding function. Box nodes (124, 128, and 132) correspond to solution nodes and the mixed nodes (136, 140, and 144) represent dead nodes that were not pursued further in this example. Thus the given perceptron is mapped to a Boolean function which is given as $f = x_1 x_2 \vee x_1 x_4' x_2 x_4'$.

The backtracking search procedure is extended to multivalued inputs. Consider a neuron with n multivalued inputs having the p-valued 0/1 encoding scheme. Let the i-th input weight, $w_i$, be negative. The output of the neuron remains unchanged under the following transformation:

$x_i^j := p_i - 1 - x_i^j$ $q(x_i^j) := 1 - q(x_i^j)$ $w_i := -w_i$ $T := T + |w_i|$

This transformation is termed the negative weight conversion rule or the admissible transformation. For a neuron using the p-valued −1/1 encoding scheme, the negative weight conversion rule is as follows:

$x_i^j := p_i - 1 - x_i^j$ $q(x_i^j) := -q(p_i - 1 - x_i^j)$ $w_i := -w_i$

In this case, no adjustment to the threshold value of the neuron is performed. For the $q_{min}/q_{max}$ encoding scheme, the corresponding negative weight conversion rule is given as:

$x_i^j := p_i - 1 - x_i^j$ $q(x_i^j) := -q(x_i^j) + q_{i\,min}$ $w_i := -w_i$ $T := T + |w_i|(q_{i\,min} + q_{i\,max})$ where $q_{i\,min}$ and $q_{i\,max}$ respectively are the encodings of the extreme states of variable $x_i$. If a quanta set is not evenly spaced, it will not be the same after negative weight conversion. For example, the quanta set {−1, 1, 2} will be transformed to {−1, 0, 2}. From above, it is seen that the negative weight conversion rules for 0/1 and −1/1 encodings are the special cases of $q_{min}/q_{max}$ encoding scheme. Henceforth, only the $q_{min}/q_{max}$ encoding scheme is considered in describing the backtracking search procedure for symbolic mapping. However, it should be understood that the present invention encompasses using the other encodings.

Unlike the binary case where inputs are sorted by corresponding weight values, the ordering of multivalued inputs takes into account not only the corresponding weights but also the encoding of each multivalued variable, as different variables may not have the same encoded representation. As a result, the ordering of multivalued inputs is done using a heuristic scheme based on two sorting keys. The primary sort key is the product of weight and the average difference of adjacent quanta for each input. The secondary sort key is the cardinality of quanta set for each input variable. As an example of this sorting scheme, consider a neuron with three multivalued inputs, $x_1$, $x_2$, and $x_3$. Let $x_1$ be an ordered variable with values from the set $P_1 = \{0,1,2\}$ which is encoded using the p-valued 0/1 scheme. Let $x_2$ be a binary variable with 0/1 encoding. Let $x_3$ be an unordered multinomial with values from the set color={red,green,blue,black} which is encoded using the $q_{min}/q_{max}$ encoding scheme with quanta set $Q_3 = \{0.1, 0.25, 0.5, 0.9\}$. Letting the input weights to be 2.8, 1.5, and 3.5 respectively, the suggested sorting scheme will rank $x_2$ first, $x_1$ second and $x_3$ last.

The nature of the bounding function used in backtracking search for symbolic mapping with multivalued inputs remains substantially similar. For the general case of $q_{min}/q_{max}$ encoding, it is given as $$\sum_{i=1}^{k} w_i q(x_i) + \sum_{i=k+1}^{n} w_i q_{i\max} \geq T \text{ with}$$

$$\sum_{i=1}^{k-1} w_i q(x_i) + \sum_{i=k}^{n} w_i q_{i\min} < T$$

where k, k=0, . . . ,n, is the tree depth of the current subpath, n is the number of neuron inputs and $q(x_i) \in Q$, the set of encoded values for $x_i$. The first term in the bounding function corresponds to the partial activation sum of the neuron based on the current tree subpath. The second term indicates the maximum activation due to the remaining portion of the current tree subpath or the remaining inputs of the neuron. The sum of two terms must be greater for the current subpath to lead to a solution. The solution function is given as:

$$\sum_{i=1}^{k} w_i q(x_i) + \sum_{i=k+1}^{n} w_i q_{i\min} \geq T \text{ with}$$

$$\sum_{i=1}^{k-1} w_i q(x_i) + \sum_{i=k}^{n} w_i q_{i\min} < T$$

While the first term of solution function is identical to the first term of bounding function, the second term in this case represents the minimum activation due to the remaining portion of the current tree subpath. The use of solution function as mentioned earlier eliminates the possibility of generating any unnecessary superset of solution subset.

The symbolic mapping algorithm in recursive form is as follows. This algorithm outputs the symbolic input of a given neuron in the form of a table from which an expression in the sum-of-product form can be written by inspection.

While building this table, the algorithm uses the property that threshold functions are monotonic functions. According to this property $f(x_1,x_2,\ldots,x_n) \geq (y_1, y_2, \ldots y_n)$ if $x_i \geq y_i$ for $i=1,2,\ldots,n$.

Algorithm: Symbolic mapping of a neuron for the general multivalued $q_{min}/q_{max}$ system.

Input: Neuron weight vector (W), threshold (T), set of quanta vectors ($Q_i$, i=1, . . . ,n)) and cardinality vector of each quantum (P).

Output: Multivalued logic function in sum-of-products (SOP).

Figure 4:
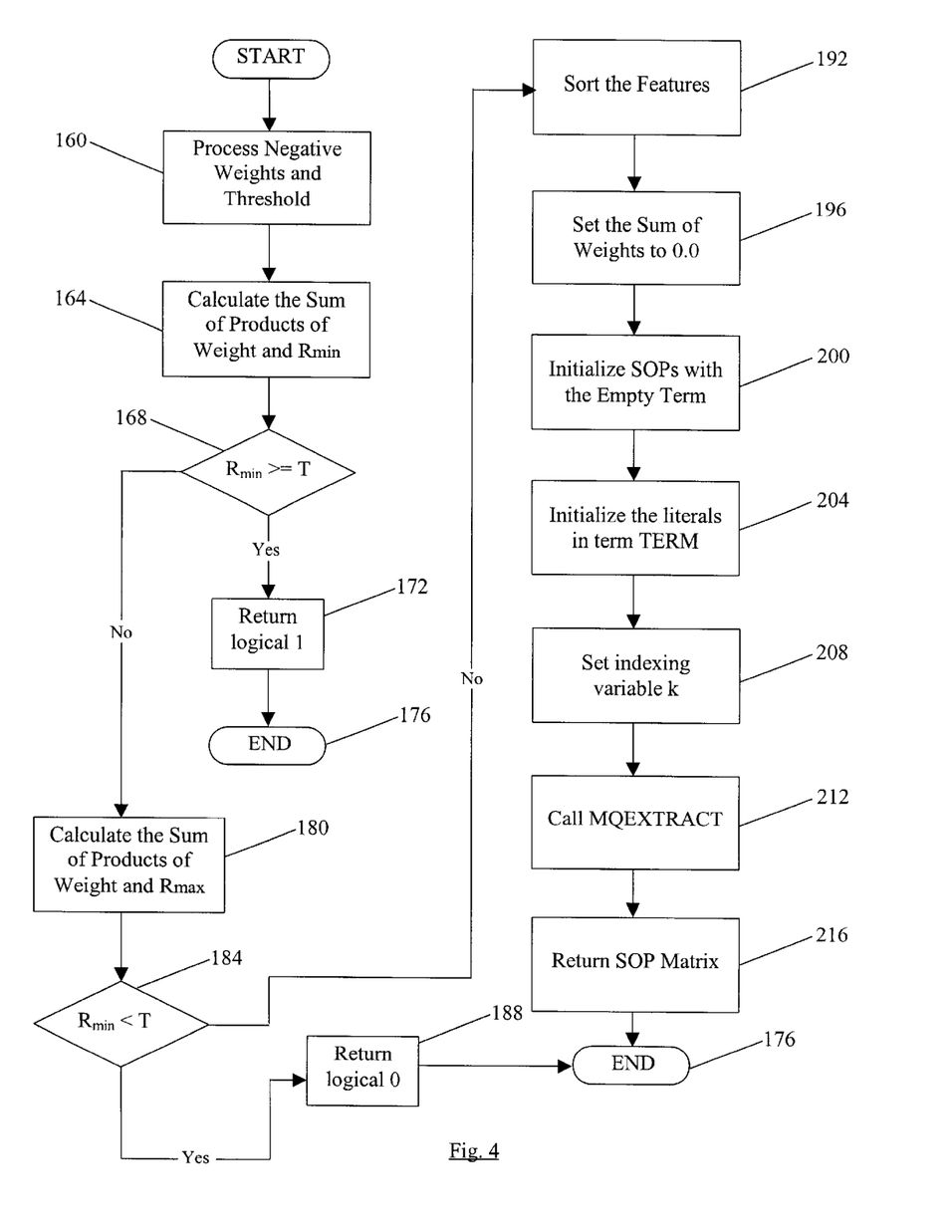
FIG. 4 is a flow chart depicting the operations performed for generating multivalued logic function in sum-of-products (SOP)

With reference to FIG. 4, the following operations are performed:

1. At block 160, negate the negative weights to positive weights (W(i)) and adjust the threshold (T).
2. At block 164, calculate the sum of products of weight and minimum quantum ($R_{min}$).
3. At decision block 168, if $R_{min} \geq T$ then block 172 returns logic one before terminating at end block 176.
4. At block 180, calculate the sum of products of weight and maximum quantum ($R_{max}$).
5. At decision block 184, if $R_{max} < T$ then block 188 returns logic zero before terminating at end block 176.
6. At block 192, sort the features. The primary sort key is the product of weight and the average difference of adjacent quanta for numeric variables or the average difference of adjacent weights for multinomial variables in descending order. The secondary sort key is the cardinality of quanta set in descending order.
7. At block 196, set the sum of weights in the selected subset to 0.0 (S:=0.0).
8. At block 200, initialize the sum-of-products (SOP) with the empty term.
9. At block 204, initialize the literals in term TERM, TERM(i)=0 for i=1, . . . ,n, denoting TERM(i) has all elements of the quanta set {0, . . . ,P(i)−1 }.
10. At block 208, set the indexing variable k to 1.
11. At block 212, call recursive procedure MQEXTRACT (S, $R_{min}$, $R_{max}$, k; TERM, W., $Q_k$, P, SOP).
12. At block 216, return SOP matrix.

The following is exemplary pseudocode for performing the MQEXTRACTS method:

procedure MQEXTRACT(S, $R_{min}$, $R_{max}$, k; TERM, W, $Q_k$, P, SOP)

1. j:=P(k)−1. TERM(k):=j.
2. S:=S +W(k)*$Q_k$(j).
3. $R_{max}$:=$R_{max}$−W(k)*$Q_k$(0)
4. $R_{min}$:=$R_{min}$−W(k)*$Q_k$(0)).
/* Check the solution equation. */
5. If S+$R_{min} \geq$T then
    5.1. While S−W(k)*($Q_k$(j)−$Q_k$(j−1))+$R_{min} \geq$T do
        5.1.1. S:=S−W(k)*($Q_k$(j)−$Q_k$(j−1)).
        5.1.2. j:=j−1.
    5.2. TERM(k):=j. Save the term TERM in the next product row of the SOP matrix.
    /* Check the bounding function and generate the right children. */
    5.3. While S−W(k)*($Q_k$(j)−$Q_k$(j−1))+$R_{max} \geq$T do
        5.3.1. S:=S−W(k)*($Q_k$(j)−$Q_k$(j−1)).
        5.3.2. j:=j−1. TERM(k):=j.
        5.3.3. Call MQEXTRACT(S, $R_{min}$, $R_{max}$, k+1; TERM, W, $Q_{k+1}$, P, SOP).
6. Else
    /* Generate the left child. */
    6.1. Call MQEXTRACT(S, $R_{min}$, $R_{max}$, k+1; X, W, $Q_{k+1}$, P, SOP).

End of Algorithm

Figure 5:
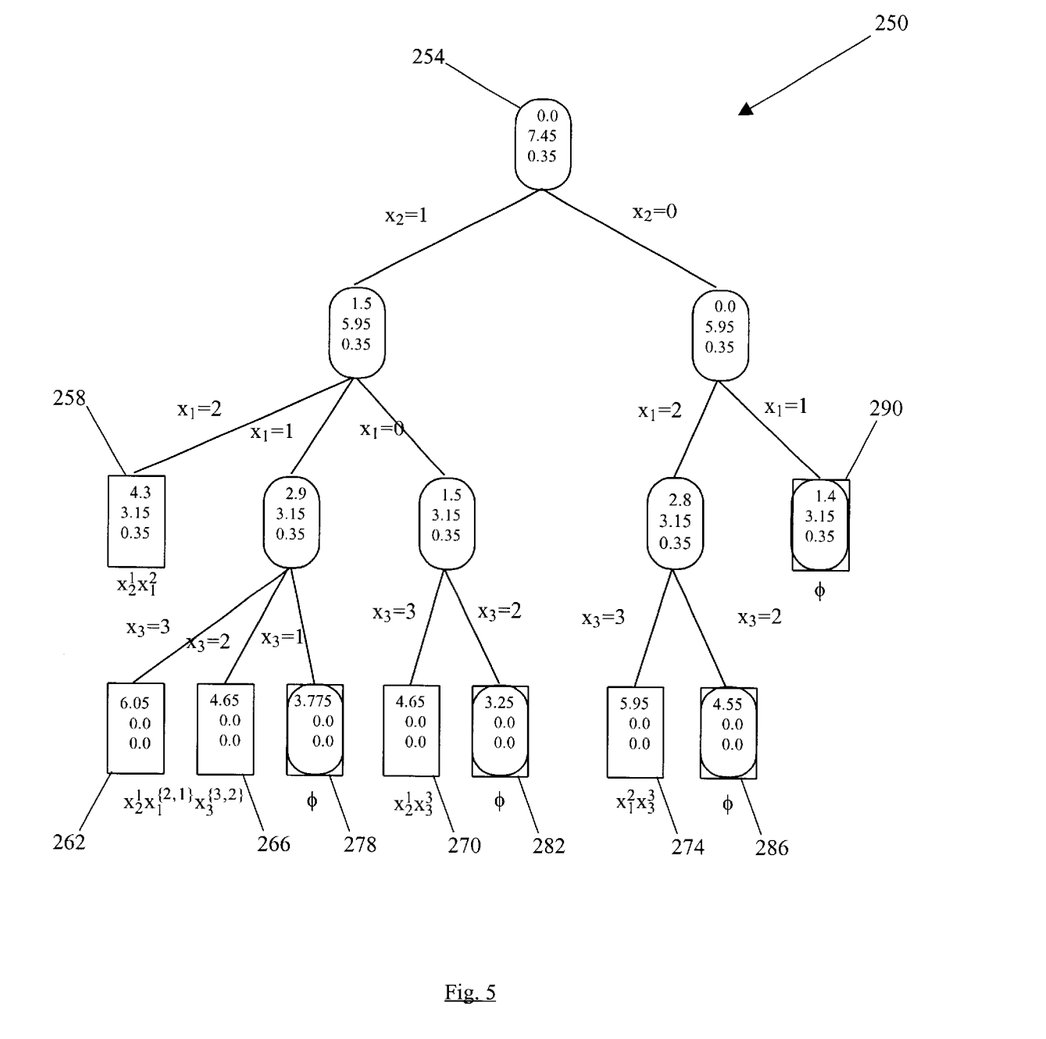
FIG. 5 is a tree diagram depicting the symbolic mapping of an exemplary neuron used in a sorting routine.

An example of the algorithm is shown in tree 250 of FIG. 5 for the neuron discussed as a sorting example. Let the threshold value for this neuron be 4.65. In tree 250 of FIG. 5, each node (e.g., node 254) has three numbers. The first number is the activation sum of the selected inputs thus far, and the second and the third numbers are the maximum and the minimum activation sums due to the remaining inputs yet to be considered. The first two numbers correspond to the two terms of the bounding function. The first and last terms correspond to the two terms of the solution function Box nodes (258, 262, 266, 270, and 274) correspond to solution nodes and mixed nodes (278, 282, 286, and 290) represent dead nodes that were not pursued further. Thus the given neuron is mapped to a multivalued Boolean function which is given as follows:

$$f = x_1^2 x_2^1 \vee x_1^{\{1,2\}} x_2^1 x_3^{\{blue,black\}} \vee x_1^2 x_3^{black} \vee x_2^1 x_3^{black}.$$

Examples of MVL Representation

Two examples of MVL representation of a neuron to obtain symbolic representation of decision making in feed-forward networks are discussed. The first example addresses a problem with inherently binary features which are grouped to define a new set of multivalued features. The example illustrates the compactness of MVL representation with respect to binary logic representation. The second example addresses a problem having continuous features which are quantized to discrete values.

Systemic Lupus Erthematosus Example

The problem dealt in the first example is that of determining the presence of systemic lupus erthematosus (SLE) in a patient. SLE is generally associated with complaints involving single or multiple organ systems and with certain laboratory conditions. The diagnostic criteria currently in use for SLE are based on a 1982 study by Tan et. al. which lists 11 symptoms shown in Table 3 (see, Tan, E M et. al., "The 1982 Revised Criteria for the Classification of Systemic Lupus Erthymatosus," *Arthritis and Rheumatism*, Vol 25, pp 1271–1277, 1982).

The presence of four or more of these criteria in a patient either at same time or in stages constitutes the diagnosis of SLE. These criteria are considered approximately 96% sensitive and specific. Using the sensitivity and specificity values of different criteria given by Tan et. al., 1,000 patient cases with 500 cases afflicted with SLE were simulated under the assumption of independence of each symptom. 500 of these were used for training and 500 for testing. Two different input representations were used. The first representation consisted of each patient being represented as an 11-component binary vector. The second representation consisted of each patient being represented as a 4-component vector of either binary or multivalued attributes. Letting $X^t = [x_1 x_2 \ldots x_{11}]^t$ and $Y^t = [y_1 y_2 \ldots y_4]^t$ stand for binary and multivalued representations respectively of each patient, the relationship between the two representations is as follows:

$$y_1 = x_1$$

$$y_2 = \sum_{i=2}^{5} x_i$$

-continued $$y_3 = \sum_{i=6}^{10} x_i$$

$$y_4 = x_{11}$$

TABLE 3

| | |
|---|---|
| 1. | Immunologic Disorder ($x_1$) |
| 2. | Malar Rash ($x_2$) |
| 3. | Discoid Rash ($x_3$) |
| 4. | Renal Disorder ($x_4$) |
| 5 | Hematologic Disorder ($x_5$) |
| 6. | Photosensitivity ($x_6$) |
| 7. | Oral Ulcertations ($x_7$) |
| 8. | Serositis ($x_8$) |
| 9. | Neurologic Disorder ($x_9$) |
| 10. | Antinuclear Antibody ($x_{10}$) |
| 11. | Arthritis ($x_{11}$) |

According to above, it is seen that $y_1$ and $y_4$ take values from the set $\{0,1\}$, $y_2$ takes values from the set $\{0,1,2,3,4\}$, and $y_3$ from the set $\{0,1,2,3,4,5\}$. In each case, a single sigmoidal neuron network was found to yield good classification accuracy. Furthermore, identical performance results were obtained for binary and multivalued representation schemes. These results for test patients are shown in the confusion matrix of Table 4.

TABLE 4

| | |
|---|---|
| 0.480 | 0.020 |
| 0.025 | 0.475 |

For binary representation, the following weight vector was obtained. The last component of the vector corresponds to the threshold or bias value of the neuron.

| | | | | | | | | | | | |
|---|---|---|---|---|---|---|---|---|---|---|---|
| 3.96 | 2.98 | 2.84 | 2.53 | 2.51 | 1.54 | 1.61 | 1.75 | 1.65 | 1.81 | 0.23 | 7.03 |

Applying the symbolic mapping procedure to this weight vector, a Boolean expression for the output of the neuron indicating the presence of SLE was obtained. This expression consisted of 125 distinct terms. Of these, 56 terms consisted of only 3 criteria and 67 terms had 4 criteria. The remaining 2 terms in the symbolic representation consisted of 2 criteria. To determine whether the use of threshold nonlinearity in the process of symbolic mapping has introduced any classification error, the entire test data was reclassified using the Boolean expression obtained by symbolic mapping. No additional errors were observed.

The multivalued input representation yielded the following weight vector.

| | | | | |
|---|---|---|---|---|
| 3.89 | 10.85 | 8.39 | 0.24 | 6.98 |

Using the symbolic mapping procedure of previous section, the following MVL expression for the output of the neuron indicating the presence of SLE was obtained.

$$f = y_1^1 y_2^{\{2,3,4\}} \vee y_1^1 y_2^{\{1,2,3,4\}} y_3^{\{1,2,3,4,5\}} \vee y_1^1 y_3^{\{2,3,4,5\}} \vee y_2^{\{3,4\}} \\ \vee y_2^{\{2,3,4\}} y_3^{\{1,2,3,4,5\}} \vee y_2^{\{1,2,3,4\}} y_3^{\{3,4,5\}} \vee y_3^5$$

Compared to the Boolean expression of 125 terms for the binary case, this MVL expression is much shorter.

Figure 6:
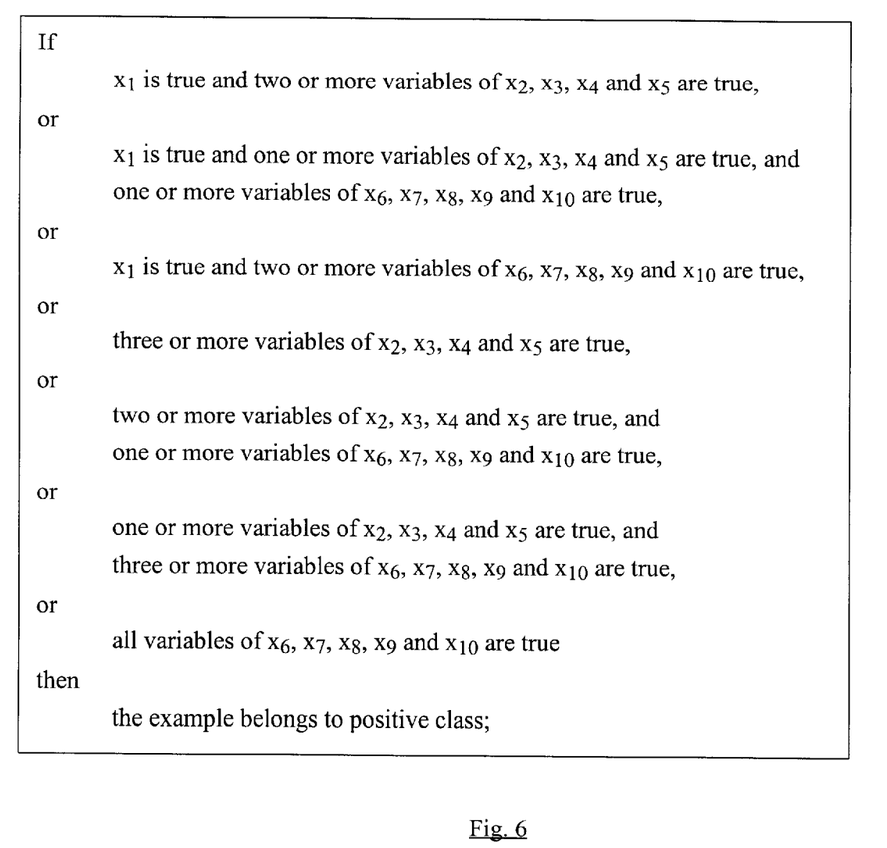
FIG. 6 is a generated report depicting the production rule representation of the multiple-valued logic (MVL) expression for a SLE (systemic lupus erthematosus) example.

Furthermore, this expression captures a representation that is more closer to the one that might be used by an expert, a physician in this example. To further illustrate this point, in FIG. 6 the representation of above expression in the form of a rule is shown.

Continuous Data Example

The second example to illustrate MVL representation of the present invention deals with two-dimensional continuous data consisting of 49 examples from two classes. This data, referred henceforth as the USER data, is taken from D. J. Hand, and it pertains to two classes of computer usage at the University of London Computer Center (see, Hand, D J *Discrimination and Classification*, John Wiley, 1981). Since the data size is relatively small in this example, the same data was used for training as well as for testing. To apply the MVL representation scheme, the data was quantized using a histogram equalization technique. In this technique, the quantization bins along each axis are placed to equalize the number of data points in each bin. The number of bins is a user specified parameter.

Figure 7:
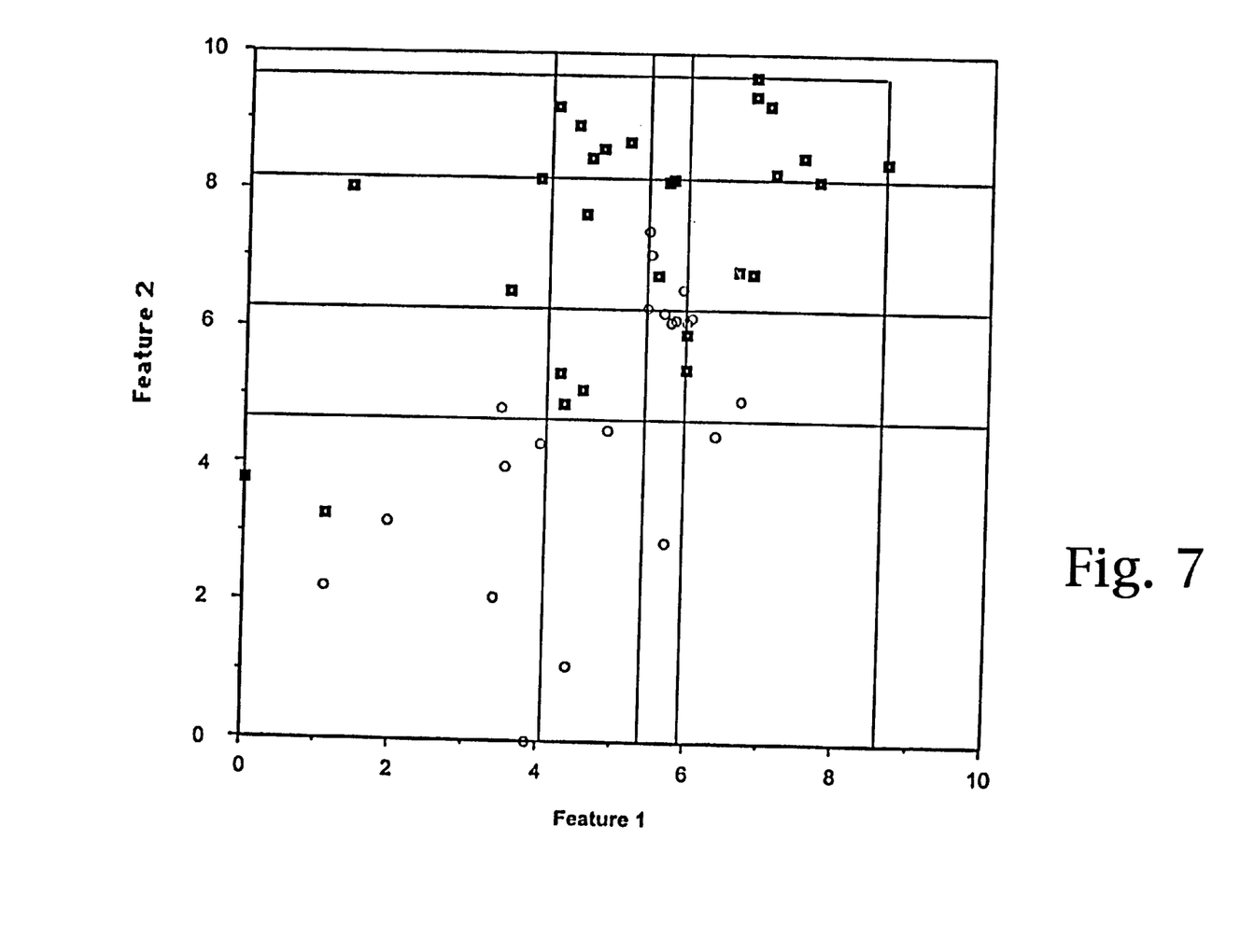
FIG. 7 is a graph showing the histogram equalization based quantization of the USER data.
Figure 8:
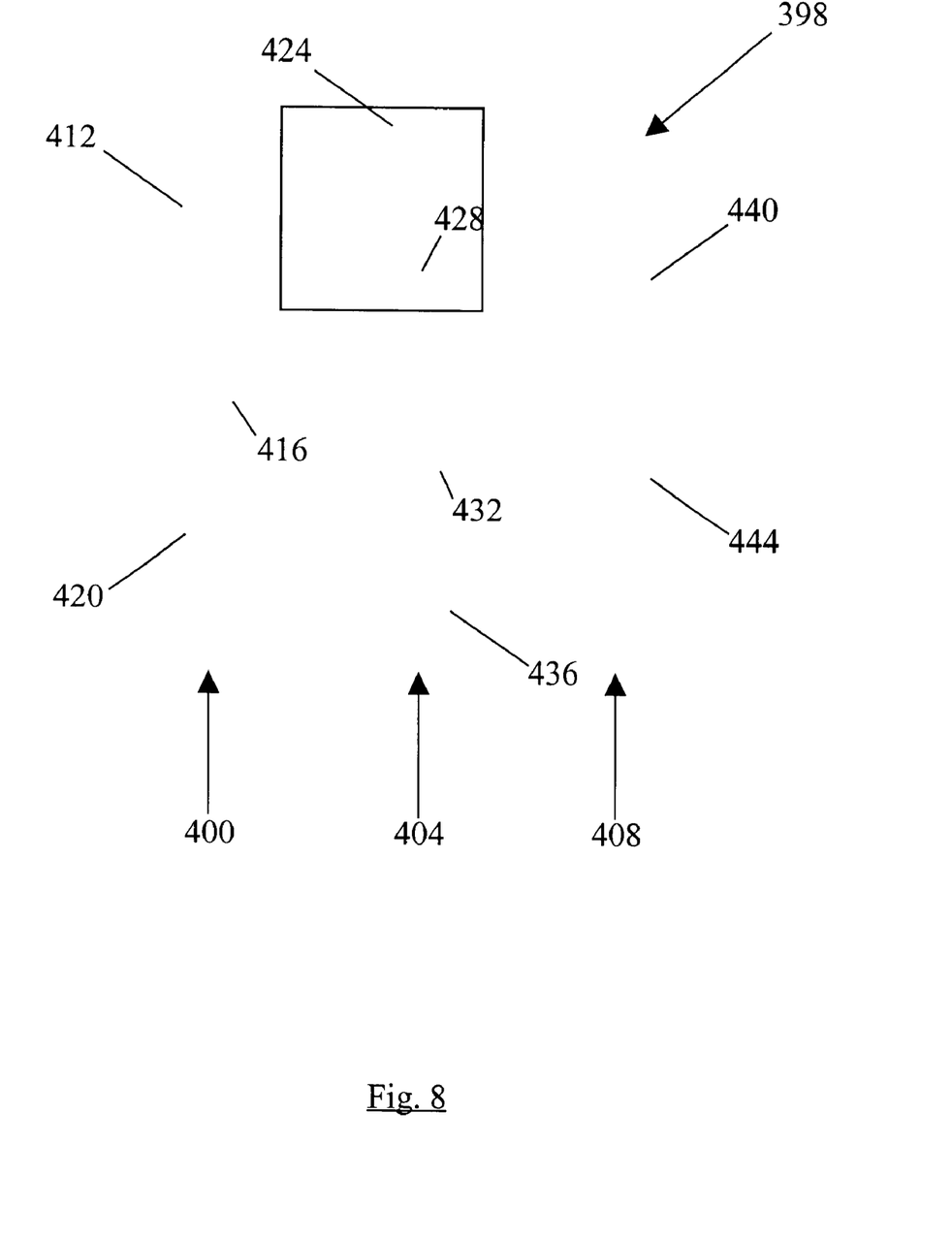
FIG. 8 is a neural diagram depicting a three-layer entropy neural network for USER data.

FIG. 7 shows the histogram equalization based quantization of the USER data. As shown in FIG. 7, four bins are used along each axis giving rise to 4-valued input features for neural network. A three-layer entropy network 398 is shown in FIG. 8 (first layer 408, second layer 412, and third layer 416). Network 398 has: three neurons with trainable weights in first layer 400 to provide feature space partitioning (neurons 412, 416, and 420); four neurons of fixed weights in the second layer to provide logical AND (neurons 424, 428, 432, and 436); and two neurons with fixed weights in the third layer to provide logical OR (neurons 440 and 444). Network 398 was trained using the quantized data. Both of the 4-valued input features were encoded using the p-valued 0/1 representation scheme. The trained network 398 yielded a classification rate of 85.71%. The following weights were obtained for the first layer neurons.

$w_1 = [0.808 - 1.483]^t$, $T = -b\ 0.3621$ $w_2 = [0.475 - 1.550]^t$, $T = -0.8169$ $w_3 = [1.635 - 3.515]^t$, $T = -0.1376$

Upon the symbolic mapping of the neurons of first layer 400 with the above weight vectors being performed, the following MVL expressions for their output is obtained:

$$p_1 = x_2^0 \vee x_2^{\{0,1\}} x_1^{\{1,2,3\}} \vee x_2^{\{0,1,2\}} x_1^3$$

$$p_2 = x_2^{\{0,1\}} \vee x_2^{\{0,1,2\}} x_1^{\{2,3\}}$$

$$p_3 = x_2^0 \vee x_2^{\{0,1\}} x_1^{\{2,3\}}$$

where $p_i$ represents the output of the i-th neuron. With the symbolic mapping being carried to the subsequent stages, the MVL represent for the output neurons 440 and 444 was obtained as follows:

$$c_1 = x_2^3 \vee x_2^{\{2,3\}} x_1^{\{0,1\}} \vee x_2^1 x_1^1 \vee x_2^2 x_1^3$$

$$c_2 = x_2^0 \vee x_2^{\{0,1\}} x_1^{\{2,3\}} \vee x_2^1 x_1^0 \vee x_2^2 x_1^2$$

These two expressions thus provide the decision making being performed by neural network 398 of FIG. 8 in a symbolic form. Since the quantization mapping is known, the above two expressions can be represented in the following form:

If $x_2 \geq 8.162$, or
$x_2 \geq 6.264$ and $x_1 < 5.391$, or
$4.671 \leq x_2 < 6.264$ and $4.066 \leq x_1 < 5.391$, or 6.264≦$x_2$<8.162 and $x_1$≧5.925 then the example belongs to class 1;

and,

If $x_2$<4.671, or $x_2$<6.264 and $x_1$≧5.391, or 4.671≦$x_2$<6.264 and $x_1$<4.066, or 6.264≦$x_2$<8.162 and 5.391≦$x_1$<5.925 then the example belongs to class 2.

Figure 9:
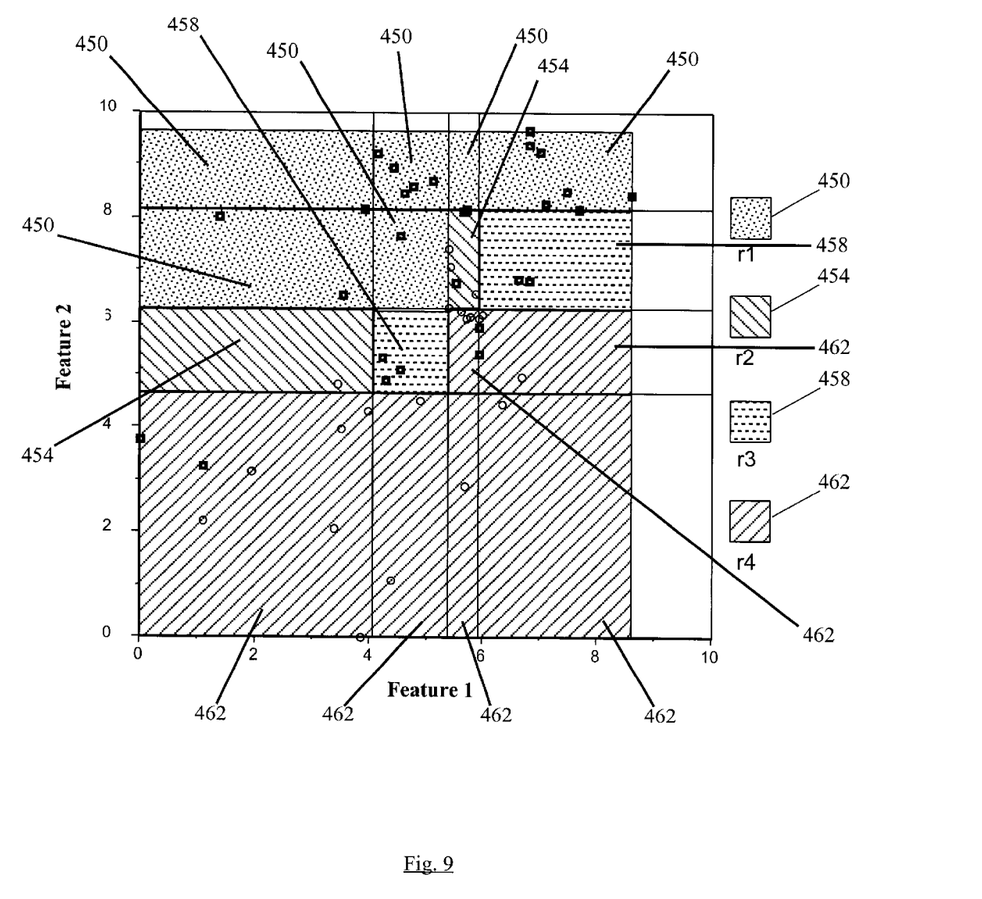
FIG. 9 is a graph depicting the decision regions for the USER data using the MVL representation.

Decision regions (first region 450, second region 454, third region 458, and fourth region) for the USER data using the above MVL representation are shown in FIG. 9. It can be seen from these regions that the level of classification performance obtained from the MVL representation is equivalent with that provided by the neural network.

While the present invention has been described in its presently preferred form, it will be understood that the present invention is capable of modification without departing from the spirit of the present invention as set forth in the appended claims.

It is claimed:

1. A computer-implemented apparatus for generating a rule-based expert system from a trained neural network expressed as network data stored in a computer-readable medium representing an interconnected network of neurons with associated weights data and threshold data, comprising:

a network configuration extractor for accessing said network data and ascertaining the interconnection structure of said trained neural network by examining said network data;

a transformation system for altering the algebraic sign of at least a portion of said weights data to eliminate differences in algebraic sign among said weights data while selectively adjusting said threshold data to preserve the logical relationships defined by said neural network;

a symbolic representation generator for applying a sum-of-products search upon each neuron in said network to generate a multi-valued logic representation for each neuron; and a propagation mechanism for generating the rule-based expert system by combining said multi-valued logic representation of each neuron through network propagation to yield a final logical expression;

said computer-implemented apparatus implementing the final logical expression as a set of rules in a rule-based expert system of the trained neural network.

2. The computer-implemented apparatus of claim 1, wherein said generated rule-based expert system includes crisp rules.

3. The computer-implemented apparatus of claim 1, wherein said neural network is generated before the rules of the expert system such that the neural network does not have a priori knowledge of the rules of the rule-based expert system to be generated.

4. The computer-implemented apparatus of claim 1, wherein said neural network does not have as an input to the neural network the rules of the rule-based expert system to be generated.

5. The computer-implemented apparatus of claim 1, wherein the propagation mechanism includes means for combining said multivalued logic representation of each neuron through network propagation to yield the final logical expression corresponding to a rule-based expert system of the trained neural network.

6. The computer-implemented apparatus of claim 1, further comprising means for encoding the multivalued logic representation of each neuron.

7. The computer-implemented apparatus of claim 1, further comprising means for performing a backtracking search for symbolic mapping.

8. A computer-implemented method for generating a rule-based expert system from a trained neural network expressed as network data stored in a computer-readable medium representing an interconnected network of neurons with associated weights data and threshold data, said neural network being unassociated with rules of the rule-based expert system to be generated, comprising the steps of:

accessing said network data and ascertaining the interconnection structure of said trained neural network by examining said network data;

altering the algebraic sign of at least a portion of said weights data to eliminate differences in algebraic sign among said weights data while selectively adjusting said threshold data to preserve the logical relationships defined by said neural network;

applying a sum-of-products search upon each neuron in said network to generate a multivalued logic representation for each neuron;

generating the rule-based expert system by combining said multivalued logic representation of each neuron through network propagation to yield a final logical expression; and implementing the final logical expression as a set of rules in a rule-based expert system of the trained neural network.

9. The computer-implemented method of claim 8, wherein said generated rule-based expert system includes crisp rules.

10. The computer-implemented method of claim 8, wherein said neural network does not have previous knowledge of the rules of the rule-based expert system to be generated.

11. The computer-implemented method of claim 8, wherein said neural network does not have as an input to the neural network the rules of the rule-based expert system to be generated.

12. The computer-implemented method of claim 8, wherein said neural network is unassociated with the rules of the rule-based expert system before said method is performed.

* * * * *